United States Patent
Kumar

(10) Patent No.: US 8,666,318 B2
(45) Date of Patent: Mar. 4, 2014

(54) METHOD AND APPARATUS FOR MANAGING CELLULAR UPLINK TRANSMISSIONS

(75) Inventor: Prachi P. Kumar, Palatine, IL (US)

(73) Assignee: Motorola Mobility LLC, Libertyville, IL (US)

( * ) Notice: Subject to any disclaimer, the term of this patent is extended or adjusted under 35 U.S.C. 154(b) by 848 days.

(21) Appl. No.: 12/490,352

(22) Filed: Jun. 24, 2009

(65) Prior Publication Data

US 2010/0331027 A1    Dec. 30, 2010

(51) Int. Cl.
H04B 1/00 (2006.01)
H04B 15/00 (2006.01)
H04B 17/00 (2006.01)
H04W 4/00 (2009.01)

(52) U.S. Cl.
USPC ........ 455/63.1; 455/501; 455/67.11; 370/332

(58) Field of Classification Search
USPC .................. 455/39, 500, 501, 507, 510, 63.1, 455/67.11, 67.13, 68, 69, 561; 370/317, 370/318, 332
See application file for complete search history.

(56) References Cited

U.S. PATENT DOCUMENTS

| | | | |
|---|---|---|---|
| 7,016,319 B2 | 3/2006 | Baum et al. | |
| 7,388,923 B2 | 6/2008 | Fukuta et al. | |
| 7,440,509 B2 | 10/2008 | Baum | |
| 8,103,284 B2 * | 1/2012 | Mueckenheim et al. | 455/453 |
| 8,428,639 B2 * | 4/2013 | Ezaki | 455/522 |
| 2001/0016499 A1 * | 8/2001 | Hamabe | 455/454 |
| 2001/0053695 A1 * | 12/2001 | Wallentin | 455/436 |
| 2005/0070285 A1 * | 3/2005 | Goransson | 455/436 |
| 2006/0045061 A1 * | 3/2006 | Duan et al. | 370/342 |
| 2006/0286995 A1 * | 12/2006 | Onggosanusi et al. | 455/522 |
| 2007/0253372 A1 * | 11/2007 | Nakayasu | 370/331 |
| 2007/0280170 A1 * | 12/2007 | Kawasaki | 370/331 |
| 2008/0144567 A1 | 6/2008 | Agami et al. | |
| 2008/0181160 A1 | 7/2008 | Dillon | |
| 2008/0188216 A1 * | 8/2008 | Kuo et al. | 455/424 |
| 2009/0122730 A1 * | 5/2009 | Yang et al. | 370/280 |

* cited by examiner

Primary Examiner — Andrew Wendell

(57) ABSTRACT

A method and apparatus used in an interfering cell of a cellular radio communication system for managing uplink transmissions. Information is received at the interfering cell, including a magnitude of an interference measured in a neighboring cell. The interfering cell has one or more active communication links to respective communication devices. A determination is made that a communication device will transmit pending data using a data repetition mode. The determination is based on the magnitude of the interference. In some embodiments, a specific data repetition mode is determined, based at least on the magnitude of the interference. A command is sent to the communication device to transmit the pending data using the specific data repetition mode.

20 Claims, 2 Drawing Sheets

METHOD AND APPARATUS FOR MANAGING CELLULAR UPLINK TRANSMISSIONS

FIELD OF THE DISCLOSURE

The present disclosure relates generally to cellular network communication and more particularly to uplink transmissions.

BACKGROUND

Techniques currently used to achieve successful uplink communications between a cellular base station and a communication device that is actively communicating with the cellular base station typically adjust the power levels and the coding and modulation of the signal transmitted to the mobile communication device on a dynamic basis to achieve at least a selected quality of service using the lowest power. When a communication device is near a cell edge, this often results in the use of a high transmit power. The information may be voice or data or streaming media (sound or video), but the information is broken up into segments of maximum length according to the protocol being used. The dynamic selection of power and coding and modulation techniques is typically performed so that the selection is constant during the transmission of a segment, and may be constant for several or many segments. In some situations, a transmission being made at the edge of the cell at a high power level causes interference with communications that are active between the base station of a neighboring cellular base station and a communication device that is active in the neighboring cell.

Certain current standards of the WiMAX series identified as IEEE 802.16 define a repetition feature in which data is repeated within a transmission by replicating the data symbols using sub-channels, but they make no statement as to when such repetition feature is to be used.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
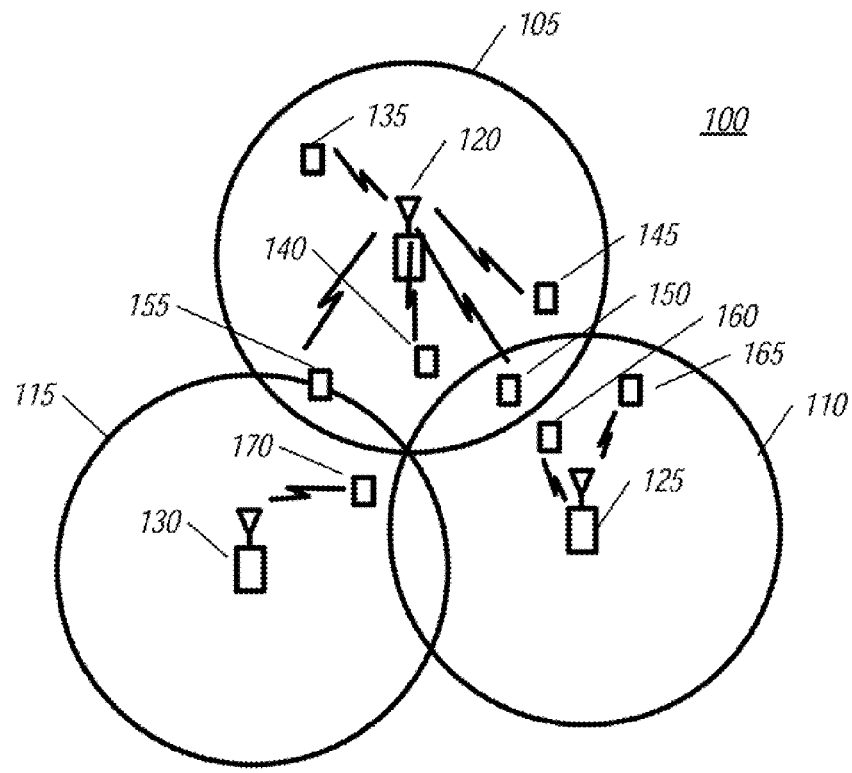
FIG. 1 is a planar schematic drawing showing a portion of a cellular communication system, in accordance with certain embodiments.

Skilled artisans will appreciate that elements in the FIGS. are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Referring to FIG. 1, a planar schematic drawing of a portion of a cellular communication system 100 is shown, in accordance with certain embodiments. The portion of the cellular communication system 100 comprises three cells 105, 110, 115, each of which is formed around a respective base station 120, 125, 130. The cells 105, 110, 115 are drawn using idealized circular boundaries, or edges, which identify the approximate range from each respective base station beyond which a candidate mobile communication device does not reliably communicate with the respective base station. It will be appreciated that the edges are not typically circular, but are determined by the terrain and structures around the base stations. Furthermore, it will be appreciated that each cell may be formed from a plurality of sectors, such as 6 sectors, formed by base station antennas having narrow beam patterns. This is well known to one of ordinary skill in the art.

There are a plurality of mobile communication devices (referred more simply hereafter as a communication devices) shown in FIG. 1. There could of course be many such communication devices within range of the base stations 120, 125, 130. The communication devices could be mobile devices, such as cell phones or other personal communication devices, or could be non-moving client devices such as desktop computers or network printers. The communication devices 135-170 shown in FIG. 1 are active; that is, they are each in a respective call (or session) that is connected by a direct radio link to a respective base station 120, 125, 130. The duration of a point to point call may be referred to as a session when the information being conveyed is not voice. It will be referred to hereafter as a call, but could be either. The calls are connected through the respective base stations 120, 125, 130 to fixed network devices that in turn are connected through a network to one or more fixed or communication devices to which each call is terminated, as is well known in the art. There could of course be many more that are active at a given time, or fewer.

One active communication device 150 is shown within the boundaries of two cells 105, 110. As is known in the art, the call of the communication device 150 may be connected only through one of the base stations 120, 125 at a given time, although the communication device 150 itself could be in communication with both base stations 120, 125 during the call so that the communication system 100 can determine which base station 120, 125 the call of the communication device 150 should be connected through. The call of each active mobile 135-170 is managed largely by the fixed network of the communication system. Certain aspects of such call control, such as initially connecting calls to a called party and determining through which base station calls are connected to the communication device at any given time, are managed by network control devices that are more typically external to the cell whose base station is linked by radio signals to the communication devices, and these network control devices typically control the base stations of several cells. Certain other aspects of calls, such as the power level and modulation and coding scheme (MCS) that are used to provide a reliable radio uplink from an active communication device to a base station are controlled by a controller that is termed herein a cell controller. The cell controller provides commands (by radio) to the communication device that define the power level and MCS scheme that the communication device is to use for its transmissions on a dynamic basis to the communication device.

Figure 2:
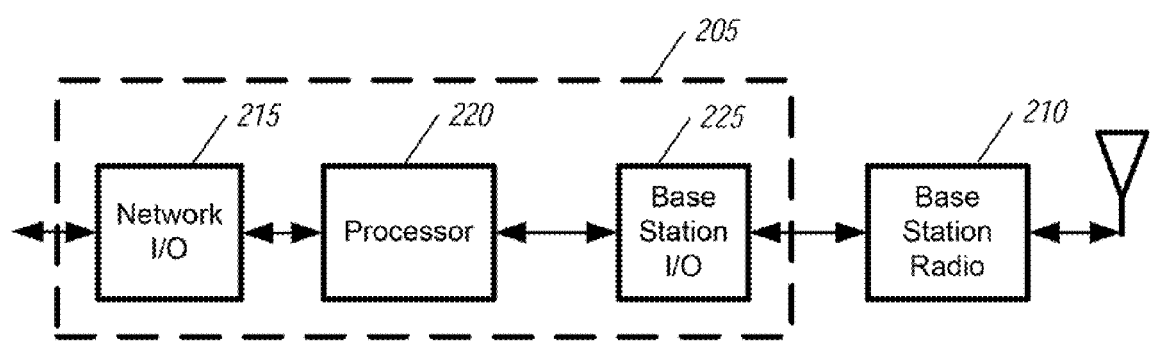
FIG. 2 is a block diagram that shows a cell controller and base station radio, in accordance with certain embodiments.

Referring to FIG. 2, a block diagram of a cell controller 205 and base station radio 210 is shown, in accordance with certain embodiments. The cell controller 205 may be an integral part of the base station, such as the base stations 120, 125, 130, in which case each base station 120, 125, 130 comprises the cell controller 205 and the base station radio 210. In some embodiments the cell controller may be a cell controller 205 that is external to the base station radio 210 (base station 120, 125, 130). If the cell controller 205 is external to the base station radio 210, the cell controller 205 may be co-located with the base station radio 210 or remotely located with reference to the base station radio 210. As indicated above, the cell controller 205 controls the power level and coding and modulation (MCS) technique, or scheme, during a call connection. As is known, the data that carries the information of the call may be broken down hierarchically into smaller and smaller portions of the call or session. At a certain level of hierarchy (which in some systems is a data packet), the power and MCS scheme are specified to remain constant during the radio transmission of the portion of a call that is transmitted at that level of hierarchy. Furthermore, the success of the receipt of the information in that portion of the call is individually determined by an acknowledgment scheme. For purposes of this document, a transmission is normally used to mean this portion of a call. A successful transmission is one that the communication device determines to have been received by the base station to which its call is connected. A transmission that is "not received" or "not successfully received" or "not successful" is one that the communication device determines has not been received by the base station, using the acknowledgment scheme, regardless of whether it is actually received successfully by the base station or not.

The cell controller 205 comprises a network I/O port 215, a processor 220, and a base station I/O port 225. The network I/O port 215 may be a conventional network I/O port for receiving and transmitting information at the cell controller. The processor 220 may be a conventional processor having associated program storage memory that contains software that controls the processor to perform a variety of functions, including passing commands and information to and from the network I/O port 215 and base station I/O port 225. The base station I/O port 225 is for sending and receiving commands and information to and from the communication devices.

In certain embodiments, when a communication device determines that a transmission has not been received by the base station, the communication device informs the cell controller or base station (depending on the embodiment) and the cell controller or base station in response may direct the communication device to transmit the transmission once again, using a higher power level and/or a "lower" MCS scheme. This re-transmission of the same information once, in response to an unsuccessful transmission, using the same or higher power level or the same or lower MCS scheme is specifically referred to hereafter in this document as a re-transmission. For purposes of this document, a lower MCS scheme is one that uses more bandwidth per bit to transmit the same information as a higher MCS scheme. It will be appreciated that in certain embodiments, the power level is kept at a lowest level required to achieve a designated quality of service, and that this level is determined by the characteristics (e.g., attenuation, distortion) of the radio link between the communication device and the base station, as well as the MCS scheme being used. A designated quality of service may influence the choice of MCS schemes and power levels. For example, some services such as voice and streaming video may demand a higher throughput rate than the transfer of bulk data.

Some system embodiments rely on re-transmissions (in response to a determination of non-receipt of a transmission) using a higher power level or a lower MCS scheme, or a combination of both, to overcome problems caused by a poor radio link. Irrespective of whether transmissions are successful or not, many systems control the transmission characteristics of a communication device as it moves towards the edge of a cell, to increase the transmit power level and/or lower the MCS scheme to maintain a designated quality of service for the call. The power level typically becomes high near the edge of a cell, often being set to the highest permissible power level. When this happens and the communication device is operating near the edge of (or within the fringe of a neighboring cell), then the transmissions of the communication device may cause radio interference to the transmissions from an active communication device to the base station of the neighboring cell. For example, referring back to FIG. 1, transmissions of active communication device 150 or even active communication device 145 in cell 105 (FIG. 1) may interfere with transmissions from active communication device 160 to the base station 125. It will be appreciated that in general, interference between communication devices operating in neighboring cells may be largely constrained to communication devices operating using same channel(s). In this context, a channel is meant to imply orthogonal transmission parameters are used to allow simultaneous transmissions by different communication devices without interference. Examples of common channels are: frequency division channels, time division channels, polarization, and code division channels. Because interference between communication devices may be largely restricted to communication devices operating on the same channel or channels, this factor may be used to determine which active communication devices may be interfering with a communication device in a neighboring cell. That is, it will typically be restricted to the active communication devices operating on the same channel(s) as the communication device that is interfered with, or the same channels on which the neighboring cell's base station measures interference.

Figure 3:
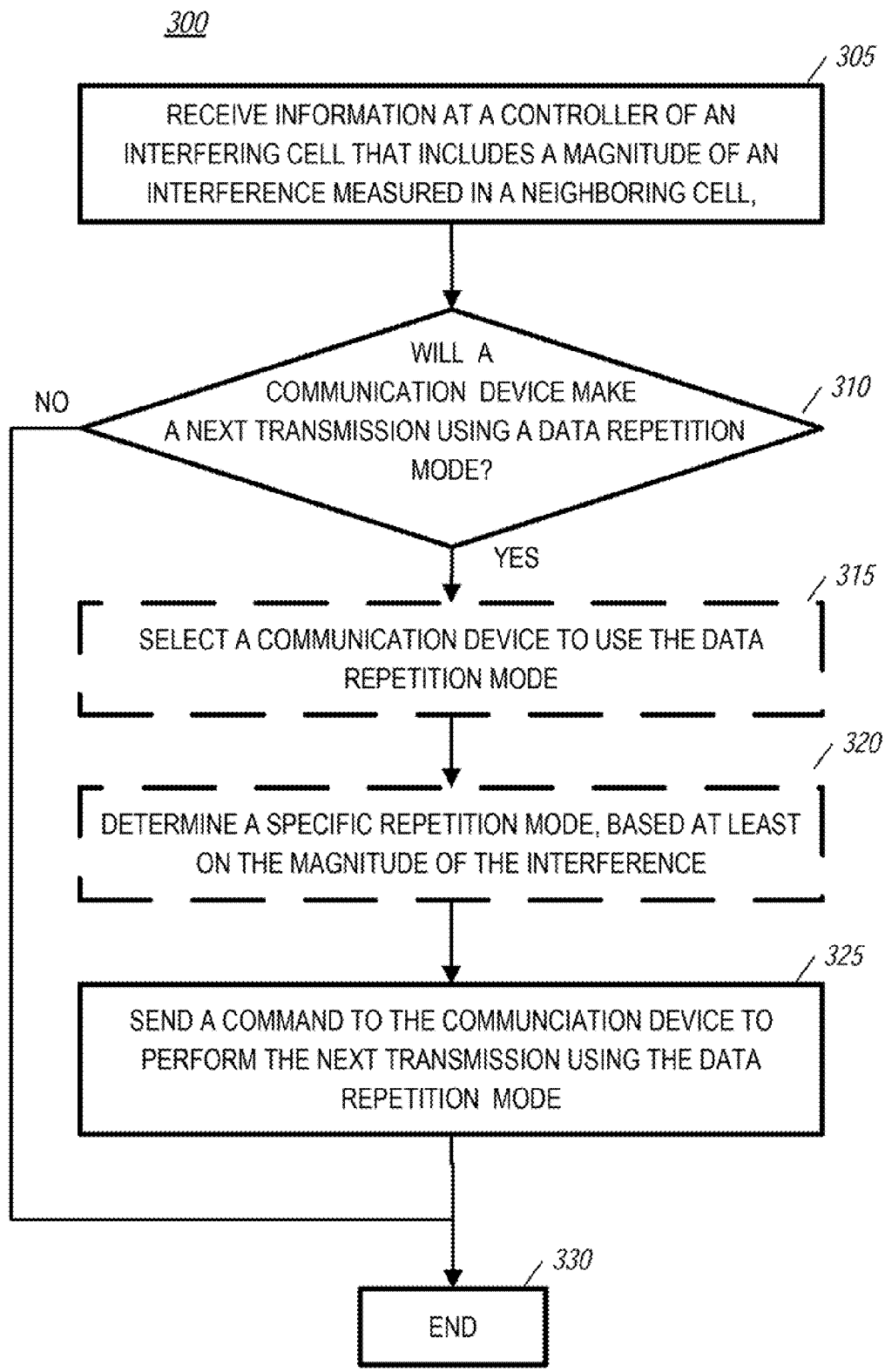
FIG. 3 is a flow chart that shows some steps of a unique method that is used in a cell controller of a cellular radio communication system, in accordance with certain embodiments.

Referring now to FIG. 3, some steps of a unique method 300 that is used in a cell controller of a cellular radio communication system, such as cell controller 205 (FIG. 2), are shown, in accordance with certain embodiments. At step 305, information is received at the cell controller (this may be alternatively referred to as a report). The information includes a magnitude of an interference measured in a neighboring cell of the cell. For purposes of identification, a cell is referred to herein as an "interfering cell" when one or more calls are connected through the interfering cell, and an interference is reported by a neighboring cell (regardless of whether the interference is known to originate from the interfering cell). This is notwithstanding the fact that the interference is likely caused by communication devices that are active in the interfering cell, not the base station of the interfering cell. The cell controller 205 in that case may be referred to as a controller of an interfering cell. The interfering cell has one or more active communication links to one or more respective communication devices. When the magnitude information includes channel information, the definition of active communication devices in the interfering cell may be constrained to mean the communication devices engaged in a call or session that are on the same channel as identified in the report of the magnitude of interference.

A determination is made at step 310 that a communication device of the one or more communication devices will make a next transmission using a data repetition mode, wherein the determination is based on the magnitude of the interference. For example, in some embodiments, the magnitude of the interference may be a measurement of absolute noise energy and it may be compared to an absolute noise energy threshold to make the decision. In some embodiments, the magnitude of the interference may be a measurement of a signal to noise ratio, which may be compared to a signal to noise threshold. In some embodiments, the magnitude of the interference may be a report of both an absolute energy level and a relative energy level which may be used in some mathematical combination with two corresponding thresholds to make the decision. Other noise assessment techniques known to those of ordinary skill in the art could be used to make the decision in step 310. When the decision is that no communication device will make a next transmission using a data repetition mode at step 310, then the method stops at step 330.

When the decision is that a communication device (i.e., at least one communication device) will make a next transmission using a data repetition mode) at step 310, then a communication device may be selected to use the data repetition mode at step 315. Step 315 is optional (shown using a dotted line in FIG. 3) because in some instances, there may be no active communication devices or be only one active communication device and no selection is needed. When there is more than one active communication device, then the selection of a communication device to use the data repetition mode done in step 315 may be based on at least a positional determination of the communication device(s). In some embodiments, the positional determination may be an approximate geographical position, such as provided by GPS techniques or triangulation techniques that are known in the art. Such information may be determined by the cell controller of the interfering cell or it may be determined by the cell controller of the neighboring cell and reported to the cell controller of the interfering cell, such as in a same message in which the magnitude of interference is reported. In some embodiments in which cells are subdivided into radio sectors, the magnitude of interference information may be accompanied by an identification of the sector of the neighboring cell in which interference was detected. This sector information may be used to approximate a geographical location of the active communication device causing the interference to a sector within the interfering cell that is adjacent to the sector of the neighboring cell in which the interference was measured.

When positional locations of the active communication devices are determined, then a selection based on that information and a known position of the neighboring cell (i.e., the position of the base station of the neighboring cell) may be made. In some embodiments, the active communication device that is closest to the base station of the neighboring cell from whom the report of the magnitude of interference is received may be selected. In some embodiments, more than one active communication device may be selected, in which case the subsequent steps (320, 325) may be applied to each of them. For example, all active communication devices that are within a threshold range of the base station from whom the report of the magnitude of interference is received may be chosen. In some embodiments, the positional information of the communication devices may be only an approximate range of the communication devices from the interfering cell's base station (inferred from a power level and MCS scheme that is being used to provide uplink communications), rather than a geographic location. In these embodiments, the determination may be made based only on the range. For example, the active communication device having the greatest range may be selected, or all active communication devices that are beyond some range threshold may be selected.

In some embodiments, the selection of the communication device(s) may be based wholly or in part on a number of communication devices that are active within the interfering cell. For example, all active communication devices may be selected when there are fewer than a threshold number of active communication devices. This rule may be used particularly when the positional information is limited only to an approximate range of each active communication device. For example, in some embodiments, when a magnitude of interference indicates that a signal to noise ratio is less than 3 db, and the cell controller of the interfering cell has knowledge of the power level and MCS scheme currently being used in all active mobiles, but does not know their geographic location, but there are less than 4 active mobiles, the cell controller may select all active communication devices.

When the active communication device(s) has been selected, then at step 320 a determination is made of a specific data repetition mode to be used for the (or each of the) communication device(s), based at least on the magnitude of the interference and, in some embodiments, the parameters used to transmit a recent transmission from the active communication device. When an active communication device is commanded to transmit pending data using a specified data repetition mode, the mobile device will transmit each portion of the pending data using a repetition of the data in more frequency channels than used by the recent transmission. The power level used with the data repetition mode is typically kept at the same power level as for the recent transmission, so as to continue to provide a sufficiently strong signal at the base station of the interfering cell. The data repetition spreads the transmitted power over more channels, thereby reducing the interference on the channels of the communication devices of the neighboring cell that were being interfered with in the recent transmission. The recent transmission, according to the embodiment, may be the most recent of any transmission made, or the most recent call transmission made by the communication device. (A call transmission is used here to distinguish from a channel control transmission.)

It will be appreciated that, as described herein, transmitting pending data using a specified data repetition mode in response to a report of interference differs significantly from making a re-transmission of data that is performed in response to non-receipt of an acknowledgment to a transmission. First, a command (or decision) to re-transmit data (as defined herein) is in response to non-receipt of an acknowledgment. The command (or decision) to re-transmit data is not given (or internally determined) until after a preceding transmission of the data that is being re-transmitted has failed. In contrast, the command to use the repeat mode is in response to a report of interference from an adjacent cell. The command to use the repeat mode is given irrespective of whether pending data may be awaiting a first acknowledgment or may have been re-transmitted one or more times for the purposes of error correction. In some embodiments the command to use the repeat mode may only pertain to new data (i.e., data that has not yet been transmitted a first time. Second, when a re-transmission is to be made by the cell controller (because the transmission was unsuccessful), the power level and/or MCS that is used for the re-transmission is typically changed to improve the likelihood of successful transmission on the next transmission, whereas in certain embodiments, the power level and MCS of the data repetition mode is kept the same for all transmissions made during the commanded data repetition mode. Third, the decision to re-transmit is typically made in the communication device, whereas the decision to use the data repetition mode is made in a fixed network device (the cell controller). Fourth, the total number of transmissions of the pending data for a data repetition mode is defined before the first transmission of the data, whereas the total number of transmissions of a set of data is not known prior to the first transmission when data is re-transmitted in response to unsuccessful transmissions.

It was stated above that when using the data repetition mode the mobile data device will transmit each portion of the pending data at least a defined plurality of times using a specified MCS scheme. In some embodiments, the communication device may re-transmit a data repetition transmission when the communication device determines that the base station has not received it successfully.

As an example of the determination of the data repetition mode being based on a magnitude of the interference, in some embodiments there may be one absolute interference energy threshold above which one defined data repetition mode is chosen. As an example of this rule, when the absolute interference energy at the base station of the interfered cell is above −85 dBm, then the data transmitted in the next transmission of the selected active communication device may be repeated in four channels in the next transmission at the same power level and total bandwidth used by the selected active communication device in the most recent transmission. There are more complex extensions of this concept, which may be implemented using a set of mathematical rules or a table. For example, a table could have several ranges of absolute magnitudes of interference energy, with higher valued ranges providing for corresponding to increased numbers of data repetitions used for a next transmission.

In some embodiments, the specific data repetition mode is further determined based at least upon a number of communication devices active within the cell. For example, in some embodiments, when a very small number of communication devices are active communication devices (keeping in mind that when the magnitude of interference report also includes a channel identification the number of active communication devices may be quite small), a lower corresponding MCS scheme may be specified than when more communication devices are active communication devices.

In some embodiments, the specific data repetition mode is further determined based on positional information concerning the communication device provided to the controller by the neighboring cell. For example, a lower MCS scheme may be specified for active communication devices that are closer to the base station of the neighboring cell from whom the report of the magnitude of interference is received than for those that are farther.

In some embodiments, the specific data repetition mode is further determined based at least upon a reserve cell or sector capacity. For example, there may be a constraint as to how much additional bandwidth may be used for the data repetition mode when a reserve capacity limit of the interfering cell would be exceeded by the selection of a particular power level and corresponding MCS.

In some embodiments, the specific data repetition mode is further determined based at least upon a minimal sub channel allocation of the interfering cell. For example, the amount of additional bandwidth available for the data repetition mode may be constrained when a minimal sub channel allocation of the interfering cell would be exceeded by the selection of a particular amount of repetition.

In certain embodiments, the data repetition mode is pre-determined and step 320 is not needed. Hence, step 320 is shown in FIG. 3 as being optional. When the data repetition is pre-determined, it may be pre-determined as one type of data repetition for all communication devices, or it may be pre-determined in certain communications devices and different amongst communication devices. In one example, all communication devices in a system may have a predefined data repetition of 4 using QPSK ½.

Finally, at step 325, a command is sent to the communication device to perform the next transmission using the data repetition mode.

In some embodiments, the communication system is a system designed and operated in accordance with the WiMAX series of standards identified as 802.16. In one example of this embodiment, an active communication device operating near a cell edge of an interfering cell may be using a MCS scheme of QPSK ½ at a nominal power of 200 milliwatts, (with no repetition mode). A neighboring base station reports a magnitude of interference that is a noise energy level increase of 9.2 dBm on the same sub-channels used by the active communication device. A rule designed into the cell controller may cause the cell controller to command the active communication device to use a repetition mode having the same MCS scheme (QPSK ½) and power level, but use 2, 4, or 6 repetitions, depending on factors such as the number of active communication devices, the position of the active communication device, etc., as described above, thereby reducing the noise energy level increase in the original sub-channels to 6.2 dBm, 3.2 dBm, or 2.2 dBm. This unique approach reduces or eliminates interference, while still allowing active mobile devices in both cells to successfully continue a call.

It will be appreciated that some embodiments may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or apparatuses described herein. Alternatively, some, most, or all of these functions could be implemented by a state machine that has no stored program instructions, or in one or more application specific integrated circuits (ASICs), in which each function or some combinations of certain of the functions are implemented as custom logic. Of course, a combination of the approaches could be used.

Moreover, certain embodiments can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as "being close to" as understood by one of ordinary skill in the art, and where they used to describe numerically measurable items, the term is defined to mean within 15% unless otherwise stated. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method used in a controller of an interfering cell of a cellular radio communication system for managing uplink transmissions, comprising:
   receiving information at the controller of the interfering cell from a base station of a neighboring cell, the information including a magnitude of an interference measured on an uplink transmission in the neighboring cell, wherein the interfering cell has one or more active communication links to one or more respective communication devices; and
   when the magnitude of the interference measured on the uplink transmission in the neighboring cell exceeds a threshold,
   determining, by the controller of the interfering cell, that a communication device of the one or more respective communication devices will transmit pending data using a data repetition mode that is determined based at least on the magnitude of the interference; and
   sending, by the controller of the interfering cell, a command to the communication device to transmit the pending data using the data repetition mode.

2. The method according to claim 1, further comprising selecting the communication device from the one or more respective communication devices based on at least a positional determination of the communication device.

3. The method according to claim 2, wherein the selecting is further based on at least one of a known position of the neighboring cell and positional determinations of one or more other communication devices that are active in the cell.

4. The method according to claim 2, wherein the positional determination of the communication device is at least based on positional information provided to the controller by the neighboring cell.

5. The method according to claim 1, further comprising selecting the communication device from the one or more communication devices based upon at least a number of communication devices active within the interfering cell.

6. The method according to claim 1, wherein the data repetition mode is further determined based at least upon a number of communication devices active within the interfering cell.

7. The method according to claim 1, wherein the data repetition mode is further determined based on positional information concerning the communication device provided to the controller by the neighboring cell.

8. The method according to claim 1, wherein the data repetition mode is further determined based at least upon a reserve sector capacity.

9. The method according to claim 1, wherein the data repetition mode is further determined based at least upon a minimal subchannel allocation of the interfering cell.

10. A method used in a controller of an interfering cell for managing uplink transmissions, comprising:
    receiving information at the controller of the interfering cell from a base station of a neighboring cell, the information including a magnitude of an interference measured on an uplink transmission in the neighboring cell, wherein the interfering cell has one or more active communication links to respective one or more communication devices;
    when the magnitude of the interference measured on the uplink transmission in the neighboring cell exceeds a threshold,
    determining, by the controller of the interfering cell, that a communication device of the one or more communication devices will transmit pending data using a data repetition mode;
    selecting, by the controller of the interfering cell, the communication device from the one or more communication devices based on at least a positional determination of the communication device; and sending, by the controller of the interfering cell, a command to the communication device to transmit the pending data using the data repetition mode.

11. The method according to claim 10, wherein the selection of the communication device is further based on at least one of a known position of the neighboring cell and positional determinations of one or more other communication devices that are active in the interfering cell.

12. The method according to claim 10, wherein the positional determination of the communication device is at least based on positional information provided to the controller by the neighboring cell.

13. The method according to claim 10, wherein the selecting of the communication device from the one or more communication devices is further based upon at least a number of communication devices active within the interfering cell.

14. The method according to claim 10, further comprising determining a data repetition mode for the communication device, based at least on the magnitude of the interference and an interference limit.

15. The method according to claim 10, wherein the data repetition mode is further determined based at least upon a number of communication devices active within the interfering cell.

16. The method according to claim 10, wherein the data repetition mode is further determined based on positional information concerning the communication device provided to the controller by the neighboring cell.

17. The method according to claim 10, wherein the data repetition mode is further determined based at least upon a reserve sector capacity.

18. The method according to claim 10, wherein the data repetition mode is further determined based at least upon a minimal sub channel allocation of the interfering cell.

19. A controller of an interfering cell, comprising:
a network input port for receiving information at the controller of the interfering cell from a neighboring cell, the information including a magnitude of an interference measured on an uplink transmission in the neighboring cell, wherein the interfering cell has an active communication link to one or more communication devices;
a processor wherein when the magnitude of the interference measured on the uplink transmission in the neighboring cell exceeds a threshold, the processor determines that a communication device of the one or more communication devices should transmit pending data using a data repetition mode that is determined based at least on the magnitude of the interference; and
a base station output port wherein when the magnitude of the interference measured on the uplink transmission in the neighboring cell exceeds a threshold, the base station output port sends a command to the communication device to transmit the pending data using the data repetition mode.

20. The controller according to claim 19, further comprising selecting the communication device from the one or more communication devices based on at least one of a positional determination of the communication device and a number of communication devices active within the interfering cell.

* * * * *